United States Patent [19]

Coviello

[11] 4,450,483

[45] May 22, 1984

[54] CIRCUIT FOR IMPROVING THE QUALITY OF DIGITIZED LINE IMAGES

[75] Inventor: John W. Coviello, Baltimore, Md.

[73] Assignee: Westinghouse Electric Corp., Pittsburgh, Pa.

[21] Appl. No.: 298,557

[22] Filed: Sep. 2, 1981

[51] Int. Cl.³ .............................................. H04N 5/14
[52] U.S. Cl. ..................................... 358/166; 358/96; 358/260
[58] Field of Search ................ 358/166, 96, 138, 282, 358/284, 260; 364/515; 382/55

[56] References Cited

U.S. PATENT DOCUMENTS 4,143,401 3/1979 Coviello ................................. 358/96
4,323,974 4/1982 Sekigawa ............................ 358/166
4,355,337 10/1982 Sekigawa ............................ 358/260

Primary Examiner—Richard Murray
Attorney, Agent, or Firm—J. B. Hinson

[57] ABSTRACT

The invention relates to a system for sequentially analyzing each data point representing a digitized video line image and modifying the point to improve the quality of the image based upon an examination of surrounding data points. Specifically, data comprising a digitized scanned image with each point represented by a one bit digital signal is stored such that a matrix of data is continually supplied to a data multiplexer. The data multiplexer selects the portion of the matrix data to be compared to predetermined criteria to determine whether or not the data point being analyzed should be changed to improve the quality of the image.

6 Claims, 13 Drawing Figures

CIRCUIT FOR IMPROVING THE QUALITY OF DIGITIZED LINE IMAGES

BACKGROUND OF THE INVENTION

1. Field of the Invention

The invention relates to display systems and more specifically to a system for improving digitized line images in which each point is either black or white by examining data surrounding each point of the image to determine if the image can be improved by changing the point from black to white or vice versa.

2. Description of the Prior Art

Prior art efforts to improve the quality of digitized images by analyzing surrounding data points has been primarily accomplished using digital computers and complicated algorithms. The complexity of the algorithms and data handling problems caused these systems to be relatively expensive and, in many cases, slow.

SUMMARY OF THE INVENTION

The invention comprises a method and a system for analyzing a digitized data matrix representing a portion of a digitized raster line image to determine if the quality of the line image can be improved by changing the value of an element of the matrix. More specifically, the lines of the image are sampled with points corresponding to a line in the final image being represented by a one bit with the other points being represented by bits. An analysis of the central element of a data matrix comprising a predetermined number of bits of a predetermined number of adjacent lines is made to determine if the quality of the image can be improved by changing the central element. As in all digital systems the definition of logic "ones" and logic "zeros" can be interchanged.

DESCRIPTION OF THE PREFERRED EMBODIMENT

Figure 1:
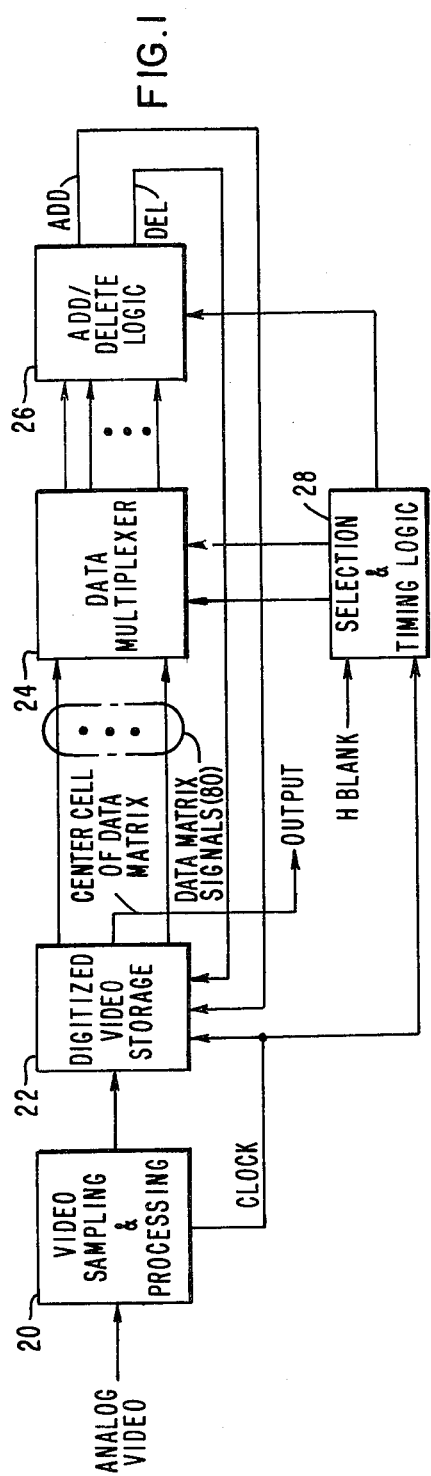
FIG. 1 is a functional block diagram of the invention.

FIG. 1 is a functional block diagram of the preferred embodiment of the invention. Conventional analog video information, such as the video signal from a TV camera or a laser-type scanner, is coupled as an input signal to a video sampling and processing circuit 20. The video sampling and processing circuit 20 processes the video information to generate a digitized line image as is conventional in the prior art. In the digitized video image each point in each line of the image is represented by a one bit digital signal with the two possible values of the bit representing black and white in the final image.

The digitized video is coupled to a storage circuit 22 such as for example, serial shift registers. The storage circuit 22 includes sufficient storage for storing digital information comprising a predetermined number of complete lines of video signal. In the preferred embodiment storage is provided for nine complete scan lines of the video image.

The digitized video storage circuit 22 provides at its output a series of one bit digital signals representing a data matrix corresponding to an area of the final image. In the preferred embodiment this data matrix represents nine adjacent samples from each of nine adjacent lines. This information is coupled to the input of a data multiplexer 24 to selectively gate the bits of the data matrix to the add/delete logic 26 for statistical analysis to determine whether the element of the matrix being analyzed should be changed to improve the image. In actual operation, the data matrix is divided into eight sections or sub-matrices with four sections being a mirror image of the other four sections. The multiplexer 24 is controlled by a logic selection and timing circuit 28 to step through the sections or sub-matrices. Synchronizing signals are provided to the selection and timing circuit 28 by the horizontal blanking pulses of the video system providing the input information and by a digitizing clock signal synchronized with these pulses.

As previously discussed, the video sampling and processing circuit 20 comprises all the circuitry necessary to convert the analog video signal into a digitized line image. More specifically, this circuitry may be the sampling system described in U.S. Pat. No. 4,143,401 assigned to the same assignee as this application. This patent is incorporated by reference.

The digitized video is stored in the storage apparatus 22 as described above. The storage apparatus 22, in the preferred embodiment, comprises 9 shift registers, with each register having sufficient storage locations to store 4,105 samples. This is a convenient number of samples for each line in that the resolution is compatible with laser scanners and integrated circuit shift registers are available in standard capacities of 4,096 bits. The additional nine bits are added to the 4,096-bit shift register because simultaneous access is required to nine adjacent bits in order to perform the statistical data analysis which will be subsequently described.

Figure 2:
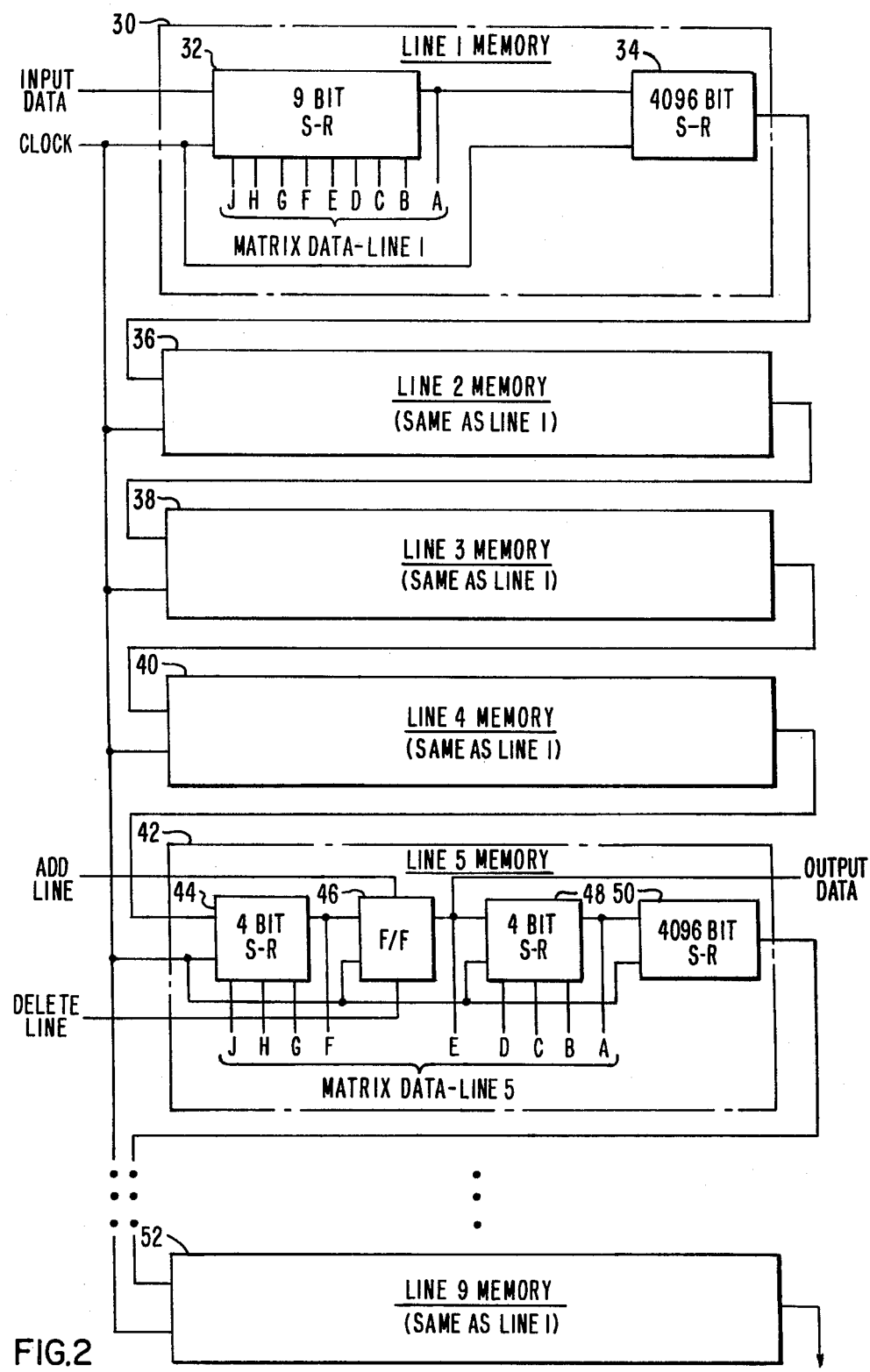
FIG. 2 is a block diagram of the data storage portions of the system.

More specifically, the arrangement of the nine shift registers is illustrated in detail in FIG. 2. The first and last four shift registers are identical with the fifth shift register being modified as will be subsequently described.

The first shift register identified by reference numeral 30 includes a first section 32 which includes nine bits with the data stored in each of these nine bits being being identified as a line #1 of the data matrix. Data from the scanning and processing unit 20 is coupled to the data input terminal of the nine bit shift register 32. The output data of the nine-bit shift register 32 is coupled to the input terminal of a 4,096-bit shift register 34. Both the nine-bit shift register 32 and the 4,096-bit shift register 34 are sequentially shifted with a high-frequency clock signal which is synchronized with the horizontal blanking pulses of the scanner and the sampling rate of the analog video signal. This continually updates the data stored in the first shift register 30 with the most recent data from the video sampling and processing unit 20.

The output data of the first shift register 30 is coupled as an input to a second identical shift register 36. The second shift register 36 is also shifted with the high-frequency clock signal previously described and has its data output terminal coupled to the data input terminal of the third identical shift register 38. Similarly, the output of the third shift register 38 is coupled to the data input terminal of the fourth shift register 40 which is also shifted with the high-frequency clock signal.

As previously described, the fifth shift register 42 differs from the first through the fourth and sixth through the ninth. In the fifth shift register 42 the nine-bit input register has been divided into three sections comprising a first four-bit register 44, a set/reset flip-flop 46 and a second four-bit shift register 48. This modified shift register feeds data to the input terminal of a 4,096-bit shift register 50. The data output signal of the fifth shift register 50 is coupled to the input of the sixth shift register 52. The remaining four shift registers are identical to the first to fourth registers described above and are similarly connected in series.

Figure 3:
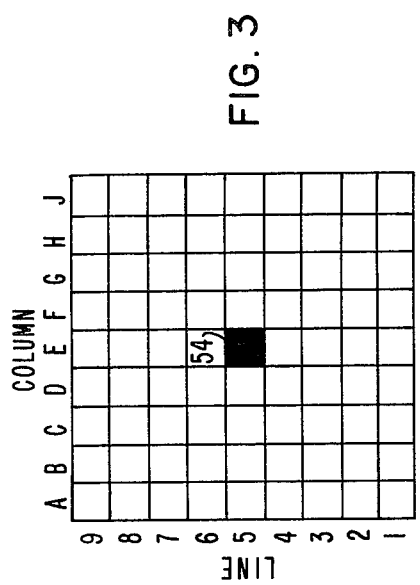
FIG. 3 is a schematic representation of the data matrix utilized in the statistical analysis.

As indicated in the discussion above, the output of the first section of the shift registers described above with reference to FIG. 2 is a matrix of data points of the digitized image. This data matrix is illustrated in FIG. 3 as a checkered-board pattern with the columns labeled A through J and the lines labeled "one" through "nine". The lines "one" through "nine" correspond with the shift registers illustrated in FIG. 2 and the columns A through J correspond to the data outputs of the first nine bits of each of the shift registers. The data point situated in the center of the data matrix illustrated in FIG. 3 has been shaded and identified with a reference numeral 54 to emphasize that this is the output of the set/reset flip-flop 46 comprising the central bit of the nine-bit input register to the fifth shift register 42. This data point is also unique in that it is not considered in the analysis of the data matrix and also provides output data for the device.

The central member of the data matrix is emphasized because the basic operating principle of the system disclosed by this application is that the remainder of the data points represented by the data matrix are statistically analyzed to determine whether or not the central member 54 can be changed from black to white or white to black in order to improve the overall quality of the final video image.

Figure 4:
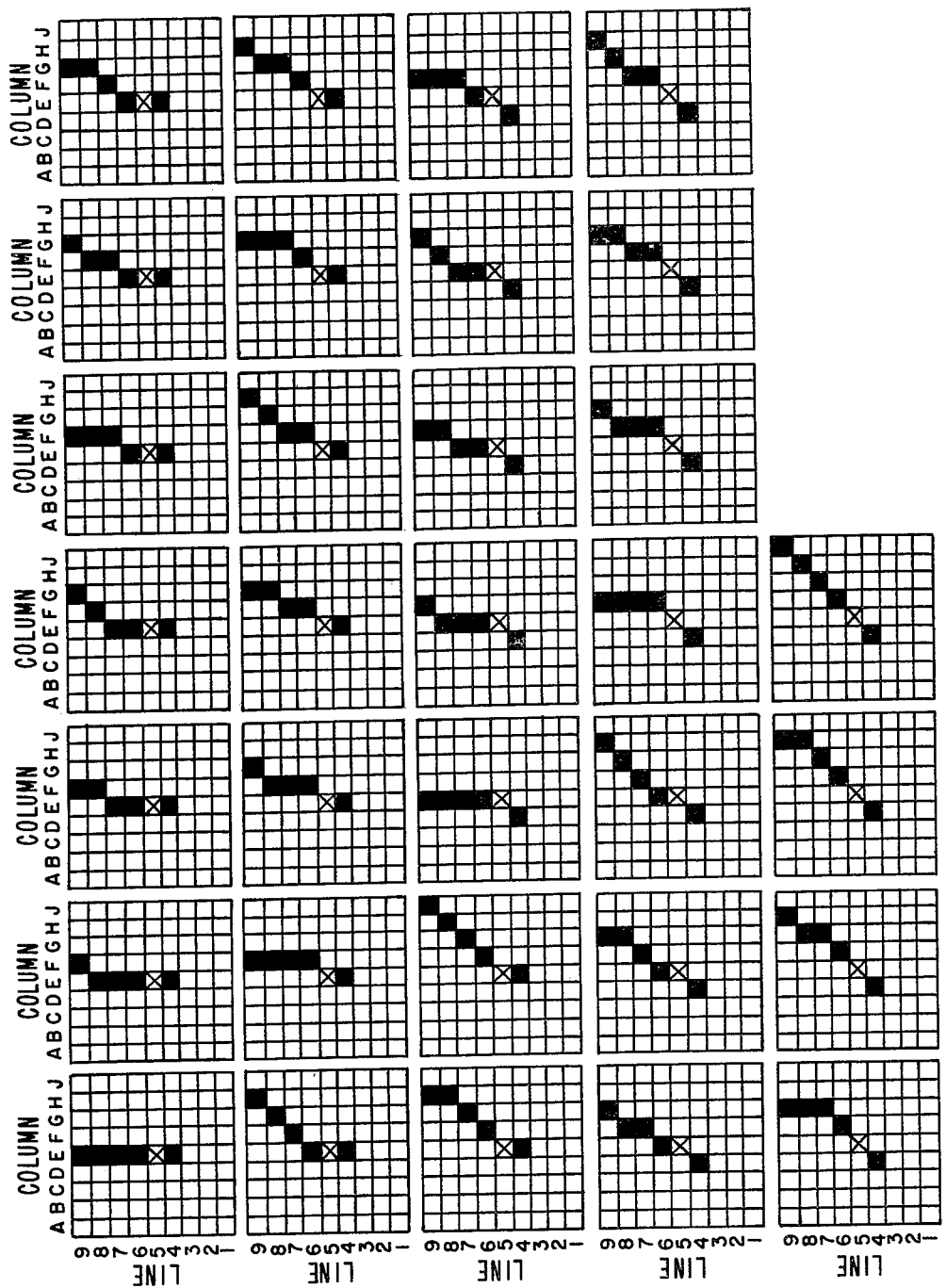
FIG. 4 is a chart showing the statistical criteria for changing a point in the data matrix from white to black.

In FIG. 4 the data matrix illustrated in FIG. 3 has been reproduced thirty-two times with the central data element of each matrix indicated by a cross. As previously discussed, each data element of the data matrix is represented by a one bit digital signal. In FIG. 3, if any pattern of logic one bits is found to correspond with the pattern indicated in black. The central data element will be changed to a logic one. The data patterns indicated in FIG. 4 are only for one-eighth of the data matrix or the portion extending from the vertical center to a line terminated in the upper right hand corner. These same patterns are then checked for the other four quadrants of the matrix and for the mirror image of each of these. This results in a total of eight patterns with each pattern including the comparisons illustrated in FIG. 4.

Figure 5:
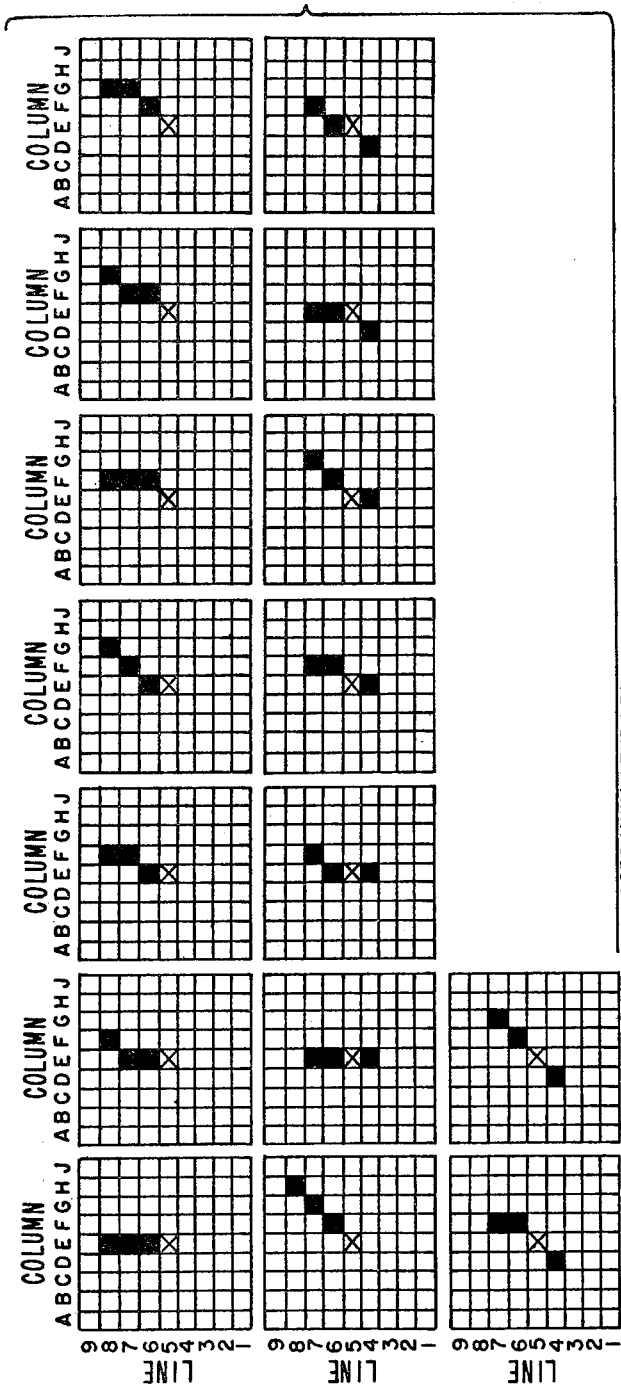
FIG. 5 is a chart representing the statistical criteria for not changing a point which is black to white.

In addition to improving the overall quality of the drawing by making a bit of the data matrix which is white, black, it is also possible to improve the pattern by making cells which are black, white. The data matrix has been reproduced sixteen times in FIG. 5 with the data patterns for retaining a cell as black being set forth. That is to say, if the central data cell of the data matrix is not bounded by at least a pattern of cells having a logic one level, as indicated by black in FIG. 5, the cell will be made to have a logic zero level.

These rules for making a cell a logic one can be summarized as follows:

(a) the cell must be bounded by one cell on one side and at least four contiguous other cells;

(b) the straight line approximation of the cell pattern may change slope only once over the six samples; with digitizing error (plus or minus one cell) not being considered as a slope change;

(c) the maximum slope change allowed over the pattern considered is 45 degrees.

If the above criteria is not satisfied, the cell is not made a logic one.

The rules for making a cell a logic zero can be summarized as follows. The cell will be made a logic zero unless:

(a) the cell is bounded by one cell on one side and two contiguous cells on the other;

(b) the cell is bounded by three contiguous cells on one side;

(c) the straight-line approximation of the cell pattern may change slope only once over the four-cell sample, with digitizing error (plus or minus one cell) not being considered as a slope change;

(d) the maximum slope change allowed over the pattern considered is 45 degrees.

Using this criteria and the nine by nine data matrix this results in the checking of 256 patterns for changing a cell to black (logic one) and 128 possible patterns for the deletion (logic zero) of a cell. As is well known is the art the functions and definitions of logic "one" and "zero" are arbitrary and can be interchanged.

Figures 6, 8:
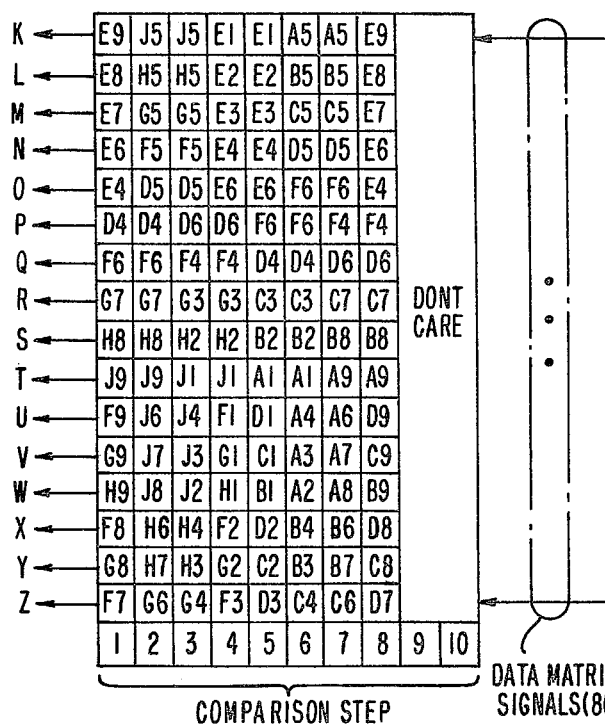
FIG. 6 is a diagram illustrating how the data points representing the data matrix are grouped with the groups sequentially examined.
FIG. 8 is a diagram defining the multiplexer.

In FIG. 6 the nine by nine data matrix has been again reproduced eight times. In this figure the data cells checked during each of the eight quadrant checks previously discussed are labeled for convenience of identification with letters K through Z. This is to emphasize that the patterns are essentially the same in all quadrants when the rotation and the mirror image considerations previously discussed are included. All eighty-one of the elements of the data matrix are available at the output of the video storage circuit (FIG. 2). All elements of the data matrix are inputs to the multiplexer 24 (FIG. 1). Functionally, each of the data patterns identified in FIG. 6 are sequentially gated from the digitized storage 22 of FIG. 1 by the multiplexer 24 into the add/delete logic circuit 26. With the selection and control logic 28 providing the gating signals to the multiplexer 24 to assure that the proper data is coupled to the add/delete logic.

Figure 7:
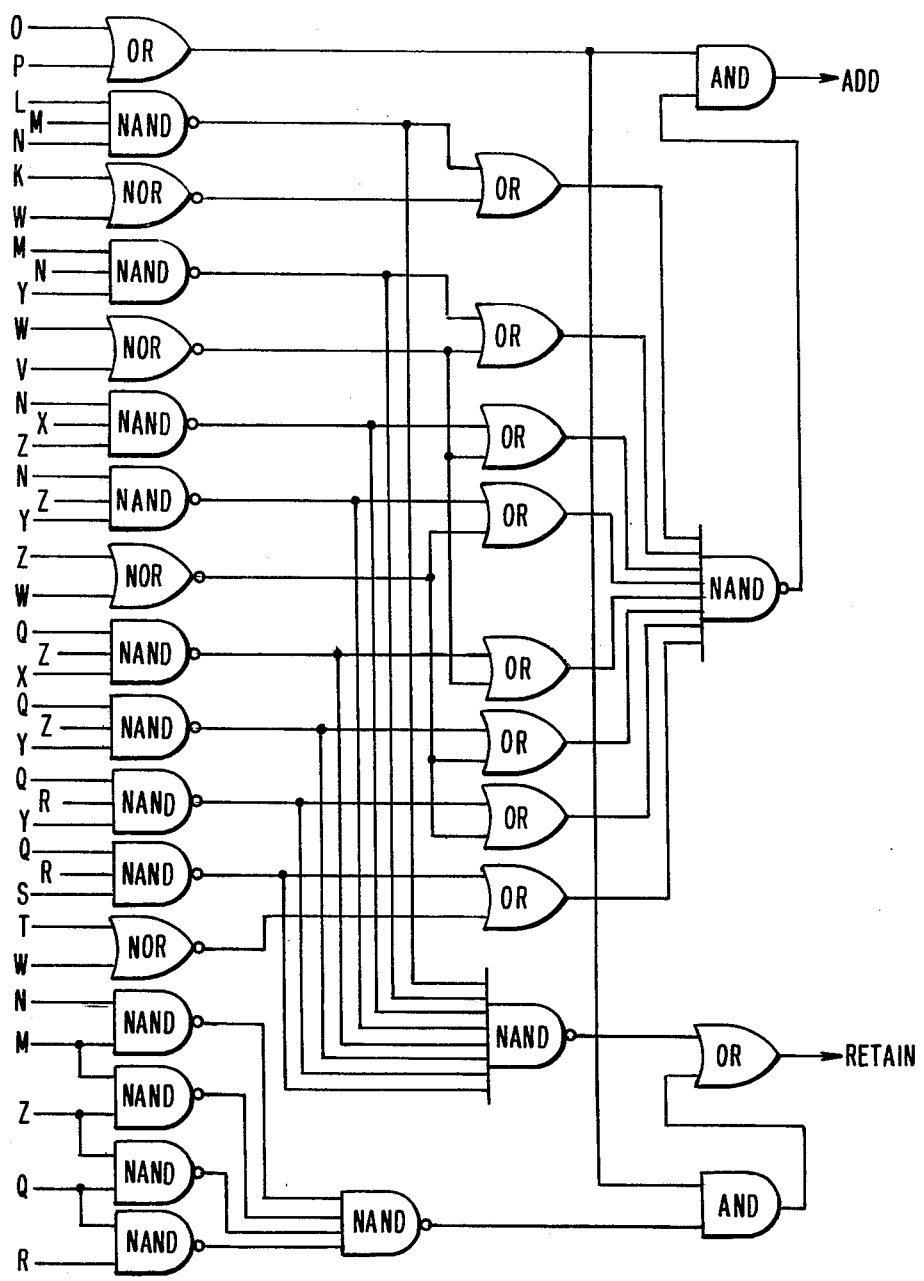
FIG. 7 is a logic diagram of the circuit which evaluates the data matrix.

The add/delete logic circuitry for determining whether the data cell being analyzed should be black or white is shown in detail in FIG. 7. In this Figure, standard logic symbols are used for each of the logic circuits and they are also labeled with their standard nomenclature. Therefore, it is believed that a line-by-line description of the operation of this circuit is unnecessary. The description of the circuit will be limited to an indication of how it is related to the data patterns to be checked.

The input terminals of the pattern recognition circuit, illustrated in FIG. 7, are labeled with letters K through Z to correspond with the same labels used in FIG. 6 to identify members of the data matrix gated to the similarly labeled terminals. It should be noted here that each of the inputs to the pattern recognition circuit, FIG. 7, is not unique. That is to say that the input signal to the terminal labeled K differs between all of the patterns indicated in FIG. 6. Similarly, the other input signals change depending upon which pattern is being checked. It is the function of the multiplexer 24, FIG. 1, to assure that the proper members of the data matrix are gated to the logic deletion circuit 7 for each of the patterns being checked.

FIG. 8 is a somewhat schematic and functional definition of the data multiplexer. Along the left edge of the multiplexer are sixteen outputs labeled K through Z. These correspond to similarly labeled inputs to FIG. 7. That is to say the output terminal labeled K in FIG. 8 is connected to the input terminal of the logic circuit of FIG. 7 to the line labeled K. The other sixteen inputs are similarly connected. Along the bottom edge of the diagram are numbers 1 through 8 with these corresponding to the individual comparison checks made for each pattern illustrated in FIG. 6. Inside the multiplexer is a matrix with each element having a letter followed by a number. Each of these numbers identify a member of the data matrix indicated in FIGS. 2 and 3. For example, the cell indicated in the upper left hand corner of the data matrix illustrated in FIG. 3 is identified in FIG. 8 with the label A9. The other members of the data matrix are similarly identified in FIG. 8. On the right side of FIG. 8 are eighty input lines with each input corresponding to a member of the data matrix shown in FIGS. 2 and 3. Using this notation the operation of the multiplexer is as follows. During the first comparison step data matrix element E9 will be gated to the output terminal labeled K, data matrix element E8 will be gated to the output labeled L, data matrix element E7 will be gated to output M and the remainder of the data matrix columns indicated in FIG. 8 will be similarly gated to the respective outputs. Similarly, during the second comparison step, data matrix element J5 will be gated to output K and proceeding down this column data matrix element E6 will be gated to input Z. For the remainder of the eight tests the data elements will be similarly sequentially gated to the respective output terminals.

Figures 9A, 9B, 9C:
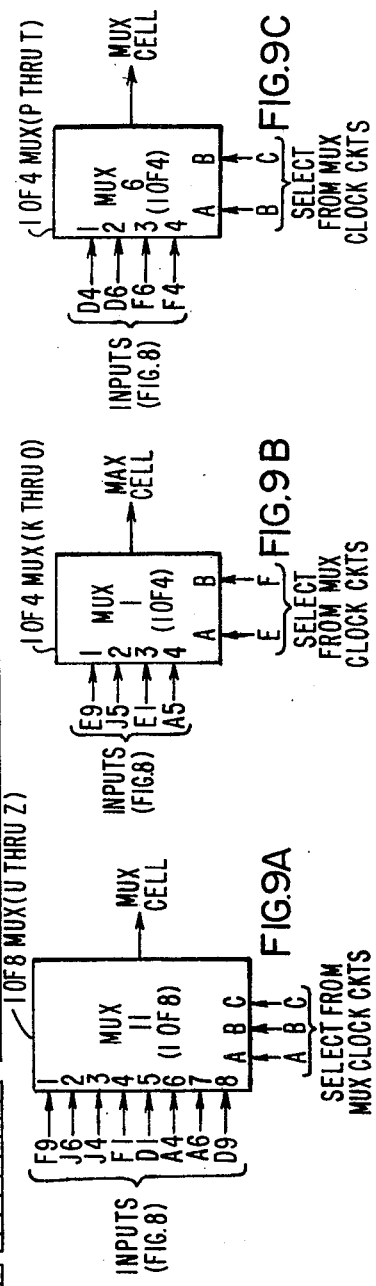
FIGS. 9A–C are diagrams illustrating typical circuits comprising the multiplexers.

Examining FIG. 8 it becomes obvious that the circuitry for implementing the gating of an output to terminal K is identical to that required for terminals L through O except for the input signals. Similarly, the circuitry for implementing the gating function for terminals P through T are identical and the circuits for gating outputs U through Z are also identical. A representative circuit for one of each of these groups is illustrated in FIG. 9 with the circuitry indicated at FIG. 9A being suitable for outputs W through Z. The circuitry at 9B is suitable for K through O and the circuitry indicated at 9C being suitable for outputs P through S. The control signals for each of these multiplexers is supplied by the timing and control logic shown in detail in FIG. 10.

Figure 10:
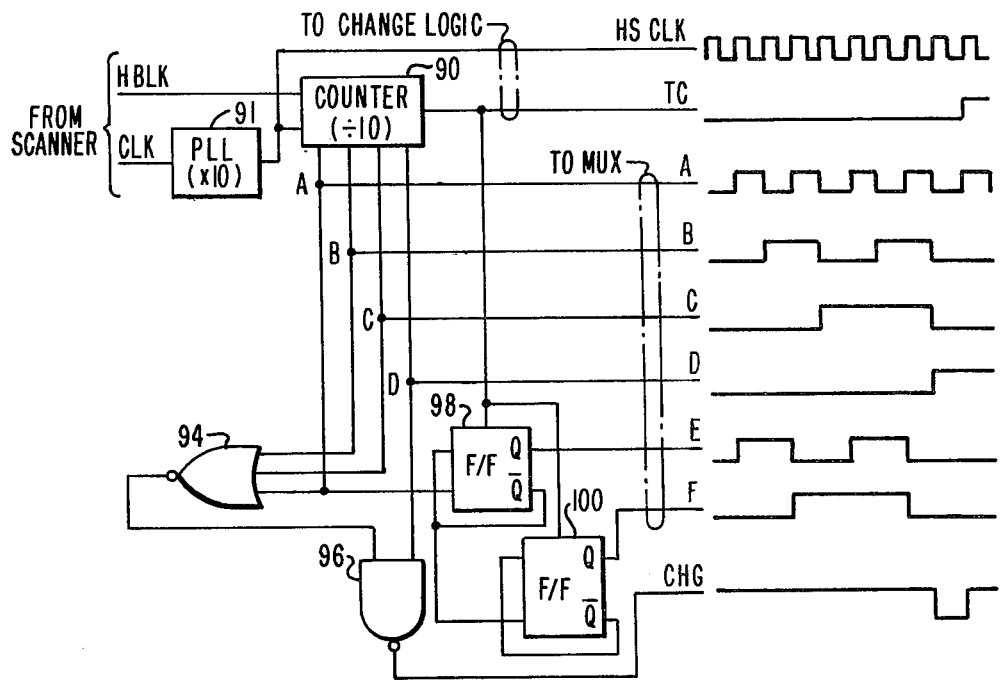
FIG. 10 is a diagram of the control circuit for generating signals which control the multiplexer.

FIG. 10 is a somewhat detailed logic diagram of the timing and control signal including wave forms generated by the circuit. Functionally, the timing and control logic receives the horizontal blanking signals from the scanner. Operationally, the horizontal blanking signal resets a divide-by-ten counter 90. The divide-by-ten counter 90 is sequentially incremented by a clock signal from a phase lock loop 90 with the phase lock loop 91 providing ten clock pulses for each point of the data matrix to be analyzed. Divide-by-ten counter 10 is designed such that all four stages of this counter provide an output. The outputs of this counter are labeled A, B, C and D with these labels corresponding to similar inputs to the various multiplexer circuits indicated in FIG. 9. Also as previously described and illustrated in FIG. 6, there are eight individual test patterns test-checked for each point. One of these tests corresponds to each of the first eight cycles of the high-speed clock signal indicated in FIG. 10. The completion of these test periods is determined by coupling the first three bits of the divide-by-ten counter 90 to the inputs of a NOR circuit 94 with the output of the NOR circuit and the fourth bit of the counter coupled into a NAND circuit 96 to generate the change pulse rising on the ninth clock pulse of the high-speed clock. It is during this time that the state of the flip-flop 46, FIG. 2, will be changed to improve the quality of the drawing if this is necessary. Additionally, the first bit of the divide-by-ten counter 90 and the output of the divide-by-ten counter are used to control two flip-flops 98 and 100 to generate the E and F control signals for the multiplexer.

Figure 11:
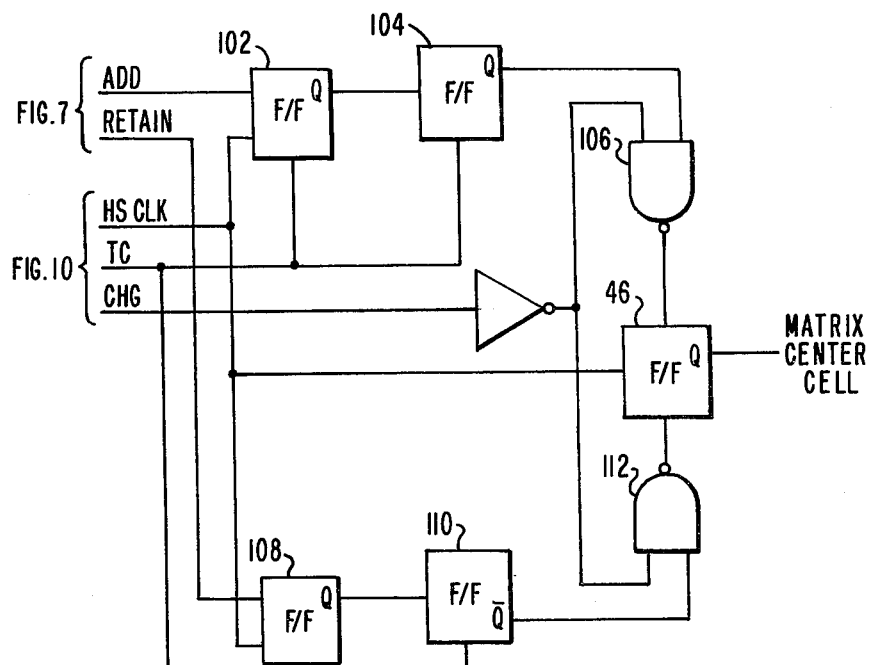
FIG. 11 is a logic diagram of the change circuit.

FIG. 11 is a detailed logic diagram of the circuitry necessary to combine the output signals of the pattern detector of FIG. 7 for all of the eight tests performed to change the state of flip-flop 46, FIG. 1, if necessary. More specifically, the add-logic signal from the pattern test is coupled to the D input of a first flip-flop 102. This flip-flop is clocked by the high-speed clock signal and reset by the TC signal from the timing circuitry of FIG. 10. Thus, if at any point during the eight pattern tests a signal is generated indicating that the point should be made dark, the D input will switch to a logic one and the flip-flop 102 set to a logic one state on the next pulse of the high-speed clock. The output of the first flip-flop serves as a clock to the input of a second flip-flop 104 causing this flip-flop to set to a logic one. Flip-flop 104 provides one input to a NAND gate 106 with the second input to this circuit being the inverted change signal from the timing and control logic, FIG. 10. If the state of the logic flip-flop 104 indicates that the point being analyzed should be dark, the flip-flop 46 reproduced here for convenience will be set to a one state. Similarly, the retain logic signal from the logic test circuit is coupled to the D input of a flip-flop 108. The output of this flip-flop serves as the clock input to a second flip-flop 110. The first flip-flop is clocked by the high-speed clock causing it to set to a logic one if the logic test circuit indicates that point should be retained. Similarly, if a point is to be retained the second flip-flop 110 would be set to a logic one. The inverse ($\overline{Q}$) output of this flip-flop, a logic zero, would be coupled to the first input of a second NAND gate 112. The second input to NAND gate 112 is the inverted change signal from the logic and control circuitry of FIG. 10. The change signal will have no affect on the state of flip-flop 46 at this time due to the logic zero at the first input of NAND gate 112 and the data in flip-flop 46 is not changed. If a valid pattern for retention is not detected during any of the eight sample periods, the output of flip-flop 108 will remain a logic zero. For this condition, the inverse ($\overline{Q}$) output of flip-flop 110 will remain a logic one and the inverted change signal will cause flip-flop 46 to be reset since none of the patterns previously described was detected and the quality of the drawing can be improved by deleting the cell of the matrix. After the completion of the eight pattern tests and the change period, flip-flops 102, 104, 108 and 110 are reset for the next data period by the TC signal from the timing and control logic, FIG. 10.

The operations described above are sequentially repeated for each element of the image. This is accomplished in real time thus each time the image is scanned the image improvement operations described above are sequentially performed.

I claim:

1. A system for producing a line drawing, comprising in combination:

(a) apparatus for processing a sampled video signal to produce a digital signal comprising a plurality of bits wherein each sampling point of the video signal is represented by a single bit digit digital signal;
  (b) means for storing a predetermined number of said single bit digital signals to produce a data matrix, said data matrix comprising a predetermined number of sample points;
  (c) means for comparing a selected element of said data matrix to a predetermined number of other elements of said data matrix to determine if the quality of said line drawing can be improved by changing the value of said selected element; and
  (d) means for selectively changing said selected element to improve the quality of said line drawing.

2. A system for producing a line drawing, comprising in combination:

(a) apparatus for sampling a raster scan video signal to produce a digital signal wherein the video signal at each sampling point is represented by a single bit digital signal;
  (b) means for storing single bit digital signals representing a predetermined number of lines, each being adjacent to at least one line which is a member of said predetermined number of lines of said raster scan video signal to produce a data matrix;
  (c) means for analyzing said data matrix and for changing a selected member of said data matrix from a logic "zero" to a logic "one" thereby adding a line segment if:
    (1) said selected member is bounded by one matrix member having a logic "one" value on one side and two contiguous matrix members having a logic "one" value on the other side; or
    (2) said selected member is bounded by three contiguous members of said matrix having a logic "one" level on one side; and
    (3) the straight-line approximation of the pattern of matrix members includes no more than one change of slope over the the four-cell sample, with digitizing error (plus or minus one cell) not being considered as a slope change; and
    (4) the maximum slope change over the pattern considered is less than or equal to 45 degrees.

3. A system for processing a digitized raster scan type line image wherein each sample point of the raster type line image is represented by a one bit digital signal, with each point on a line represented by a bit having a logic "one" level with all other points being represented by a bit having a logic "zero" value, comprising in combination:

(a) means for storing digital signals representing a predetermined number of scan lines, each scan line of said predetermined number being adjacent to at least one line of said predetermined number of lines of said image to produce a data matrix representing an area of said raster scan image with each member of said data matrix being adjacent to at least one other member of said data matrix;
  (b) means for analyzing members of said data matrix to determine if a selected member of said data matrix can be changed to improve the quality of said line image;
  (c) means for selectively changing the value of said selected member of said matrix to improve the quality of said line image.

4. A system in accordance with claim 3 wherein said means for storing digital signals representing a predetermined number of lines of said image includes a plurality of serial shift registers.

5. A system in accordance with claim 4, wherein each of said serial shift registers includes a section which provides a data output signal comprising a predetermined member of adjacent bits of the data stored therein, the collective output signals of said plurality of serial shift registers comprising said data matrix.

6. A system in accordance with claim 5 wherein said data matrix is divided into a plurality of sections, with the logic signals representing a selected section being gated into a logic circuit for analysis to determine if the logic signal representing the central member of said data matrix can be changed to improve the quality of said image with all sections being selected one at a time in a predetermined sequence until the entire data matrix has been analyzed.

* * * * *